United States Patent [19]

Wagers

[11] Patent Number: 4,683,015
[45] Date of Patent: Jul. 28, 1987

[54] METHOD OF FORMING FLEXIBLE FASTENER ELEMENTS AND SECURING THEM TO A TRAVELING WEB

[75] Inventor: Kevin J. Wagers, Midland, Mich.

[73] Assignee: The Dow Chemical Company, Midland, Mich.

[21] Appl. No.: 753,100

[22] Filed: Jul. 9, 1985

[51] Int. Cl.$^4$ .............................................. B29D 5/00
[52] U.S. Cl. ................... 156/66; 156/244.11; 156/244.25; 24/587; 264/176.1; 383/63
[58] Field of Search ............... 156/66, 244.11, 244.25; 24/572, 574, 575, 578, 579, 580, 583, 587, 588, 453; 383/63; 229/76, 77, 79, 45 R; 264/176 R, 177 R

[56] References Cited

U.S. PATENT DOCUMENTS

| Re. 24,613 | 3/1959 | Hageltorn | 24/587 |
|---|---|---|---|
| 3,198,228 | 8/1965 | Naito | 383/63 |
| 3,416,199 | 12/1968 | Imamura | 24/587 |
| 3,780,781 | 8/1974 | Uramoto | 229/66 |
| 3,784,432 | 1/1974 | Noguchi | 156/244.11 |
| 3,827,472 | 8/1974 | Uramoto | 229/66 |
| 3,848,038 | 11/1974 | Behr | 264/177 R |
| 3,904,468 | 9/1975 | Noguchi | 156/244.11 |
| 3,945,872 | 3/1976 | Noguchi | 156/244.11 |
| 4,101,355 | 7/1978 | Ausnit | 156/66 |
| 4,259,133 | 3/1981 | Vagi | 158/244.11 |
| 4,263,079 | 4/1981 | Sutrina | 156/244.11 |
| 4,279,677 | 7/1981 | Takahashi | 156/160 |
| 4,354,541 | 10/1982 | Tilman | 156/66 |
| 4,555,282 | 11/1985 | Yaro | 156/244.25 |

FOREIGN PATENT DOCUMENTS 777454 2/1968 Canada .................................. 24/587

Primary Examiner—Caleb Weston
Attorney, Agent, or Firm—L. E. Hessenaur, Jr.

[57] ABSTRACT

Methods for forming rib and groove plastic fastener elements and for securing them to a film web are provided. The rib element, as extruded, has an arrowhead-shaped tip, a concave tail, and a generally upstanding stem portion connecting the tip and tail. The groove element is formed having a base with a pair of generally upstanding neck elements disposed on opposite ends of the base. The base does not extend beyond the neck elements. The rib and groove elements are readily secured to the film web without entrapment of air between the elements and film web. Reclosable plastic containers may be formed utilizing the disclosed rib and groove elements.

11 Claims, 5 Drawing Figures

METHOD OF FORMING FLEXIBLE FASTENER ELEMENTS AND SECURING THEM TO A TRAVELING WEB

BACKGROUND OF THE INVENTION

This invention relates to fastener elements and methods of securing them to an underlying film web, and more particularly to flexible extruded rib and groove fastener elements for use on reclosable plastic bags and methods of securing such elements to the bag wall.

Plastic containers or bags which feature reclosable fasteners are well known and widely used by consumers and industry. Typically. opposing rib and groove fastener elements (also called male and female profiles) on the container are pressed together or pulled apart to seal or open the container. Because of the popularity of such reclosable plastic containers a number of different manufacturing processes and apparatuses have been developed to manufacture them. A major consideration in almost all of these prior art manufacturing processes has been the manner in which the fastener elements are formed and adhered or attached to the container walls. Problems have existed in manufacturing such as twisting or distortion of the fastener elements when applied to a film substrate, obtaining secure adherence of the fastener elements to the film substrate, or other problems which reduce manufacturing speed and efficiency or otherwise increase manufacturing costs.

One approach to the problem of securing the fastener elements to a film substrate has been to form both the film and fastener elements integrally utilizing a single blown film die. This is the approach taken by Naito, U.S. Pat. No. Re29,208, which forms a unitary tubular film with fastener elements. However, as pointed out by Behr, U.S. Pat. No. 3,848,035, such an integral extrusion process is extremely difficult to carry out. Another technique taught by Sutrina et al U.S. Pat. No. 4,263,079, is to place a fastener die in very close relationship to a film extrusion die and coextrude both the fastener and film. Adhesion of the fastener to the film occurs before any significant cooling of either the film or fastener.

Other prior processes have utilized the heat from hot, freshly-extruded, fastener elements in combination with a preheated traveling film web to fuse the elements to the film. Examples of such processes include Uramoto, U.S. Pat. No. 3,780,781; Noguchi, U.S. Pat. Nos. 3,945,872 and 3,784,432; and Takahashi, U.S. Pat. No. 4,279,677. However, the joining together of separately formed film webs and fastener elements presents manufacturing problems in terms of maintaining the fastener elements in an upright position during the joinder with the web and obtaining secure joinder without entrapping air between the bases of the fastener elements and the film web. Entrapment of air may result in adhesive failure of the lamination of the fastener element to the film web.

In order to aid in maintaining fastener elements upright during joinder, many prior processes used elements with wide and/or extended bases. However, such wide and/or extended basis contributed to air entrapment problems during joinder of the fastener elements to the film web. In the context of a coextrusion process, the Sutrina U.S. Pat. No. 4,263,079 discussed above illustrates the adhesion and air entrapment problems which occur if the traveling film and/or extruded fasteners having extended bases are not carefully joined together.

Accordingly, the need exists in the art for fastener elements and which can be readily and reliably secured to an underlying traveling film web.

SUMMARY OF THE INVENTION

The present invention provides methods for making rib and groove fastener elements and for securing them to an underlying film or sheet. In accordance with one aspect of the present invention, the fastener elements are formed by melt processing a thermoplastic resin, such as polyethylene. to form a flowable molten plastic resin and then extruding the element from a die. The rib element, or male profile. upon exiting from the die, has a generally arrowhead-shaped tip, a concave tail, and a generally upstanding stem portion connecting the two.

The die orifice is shaped to provide some concavity to the tail portion of the rib element. By concavity it is meant that the lower surface of the tail traces generally the arc of a circle so that, as extruded, there is a space formed beneath opposite ends of the tail portion of the fastener element if it is placed on a flat surface. Surprisingly however, it has been found that this as-extruded concavity is beneficial because post extrusion flow of the rib element prior to, and as it is being joined to. the underlying film web results in the lower surface of the tail portion of the element assuming a generally flat configuration which provides a good surface for effecting secure joinder of the element to the film web.

The groove fastener element, or female profile. is extruded from a die orifice so that it has a generally flat base with a pair of generally upstanding neck elements disposed on opposite ends of the base. The base does not extend beyond the neck elements as is the case with many prior art designs. Surprisingly, it has been found that secure joinder of the groove element and underlying film web may be effected utilizing this configuration. Each of the neck elements has a respective inwardly facing hook portion which is adapted to mate with the corresponding arrowhead-shaped tip portion of the rib element to effect a reclosable and reopenable seal.

The fastener elements, after being extruded from a respective rib or groove die orifice. are then preferably secured to a film web or sheet while still hot. In a preferred method, a preformed continuous film web, which may also be polyethylene, is passed through a joining area where the freshly extruded hot fastener element is guided into convergence therewith. The heat from the fastener element has been found to be sufficient to fuse the element to the surface of the film web thereby securing the fastener element to the web. The rib and groove elements of the present invention are readily maintained in their correct, upright position during joinder to the web and are secured to the web without entrapment of air beneath their bases.

The film web with fastener element secured thereon may then be formed into a series of reclosable, flexible plastic containers as is conventional in the art. Typically. the container will have a bag body with flexible walls of plastic film which are sealed on all sides but one. The open side of the container will have the releasably interlocking rib and groove fastener elements secured to opposite facing inner surfaces of the bag walls adjacent the opening. To effect closure, the opposing rib and groove elements are pressed together so that the arrowhead-shaped tip portion of the rib element mates with the corresponding inwardly facing hook portions of the groove element to effect a seal. As is also conventional, the elements may be separated by pulling the opposing bag walls apart.

Accordingly, it is an object of the present invention to provide methods for making rib and groove fastener elements and for readily securing them to an underlying film or sheet. This and other objects and advantages of the invention, will become apparent from the following detailed description, the accompanying drawings, and the appended claims.

DETAILED DESCRIPTION OF THE PREFERRED EMBODIMENTS

Figure 1:
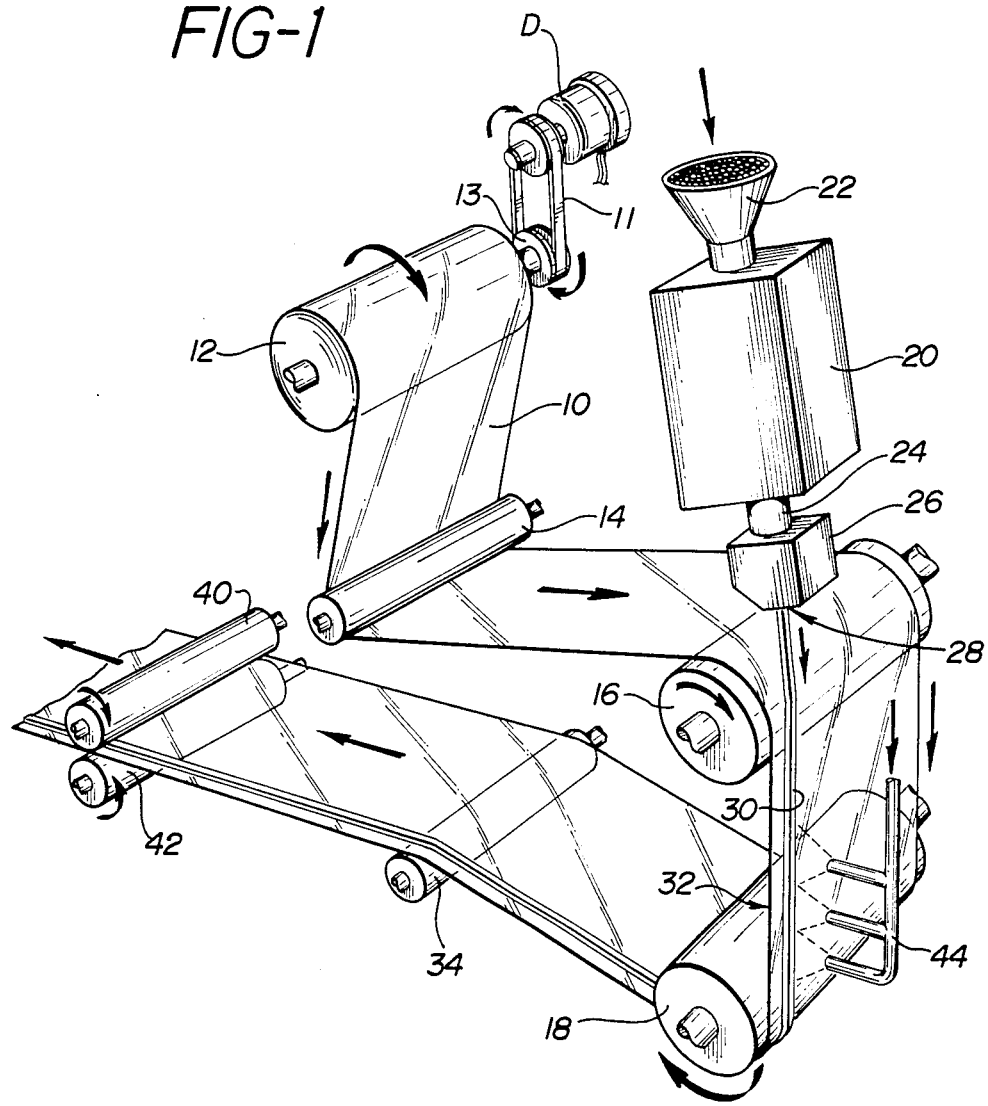
FIG. 1 is a perspective view of an apparatus suitable for making the fastener elements of the present invention and for joining them to an underlying film web.

The apparatus illustrated in FIG. 1 shows a preferred method of forming fastener elements in accordance with the present invention and, then, securing them to a film web or sheet. With reference to FIG. 1. a preformed continuous film web 10 is taken off unwind roll 12. Unwind roll 12 has tension control which may be effected, for example, through drive means D connected to unwind roll 12 through belt 11 and shaft 13. This provides the proper tension for web 10 as it passes through the apparatus.

Web 10 is then directed around idler roll 14 and onto driven rolls 16 and 18. A conventional screw extruder 20 is fed thermoplastic resin through inlet 22. After melt processing occurs in extruder 20, the molten plastic resin is sent through pipe 24 to fastener element die block 26. Although only a single die block is illustrated, it will be appreciated that a plurality of die blocks may be utilized and spaced across the width of web 10 so that a plurality of fastener elements may be extruded simultaneously onto the web. Fastener element die block 26 may be configured to extrude either a rib element or a groove element from its outlet 28 onto web 10.

For simplicity and ease of understanding, the fastener element extruded from die block 26 will be referenced by drawing numeral 30, and it will be understood that fastener element 30 may be either a rib or a groove element. As shown, fastener element 30 is guided into convergence with web 10 at a point where web 10 is just leaving the surface of roll 16. This joining area, which is generally indicated by reference numeral 32 is in the gap between rolls 16 and 18. The heat from fastener element 30 will fuse it to web 10. As shown, die block 26 may be offset from vertical by a small angle to better tension the extruded fastener element as it is brought into convergence with web 10.

Further discussion and details of the advantages of joining fastener elements to film webs in this manner are found in commonly-assigned copending application Ser. No. 753,191, entitled "Method and Apparatus for Extruding a Fastener Profile onto a Traveling Film Web," filed concurrently herewith. It will be appreciated that other specific forms of apparatus may be utilized to join the film web and fastener element including a coextrusion apparatus or an apparatus which utilize preheated, preformed film webs.

Referring back now to FIG. 1. after joinder of fastener element 30 with web 10, the assembly travels over roll 18, around idler roll 34, and is passed between driven nip rolls 40, 42 to a tension controlled winder (not shown). Roll 18 may be chilled and/or water jets 44 may be positioned as needed to spray cooling water on the fastener element and web assembly. The assembly may then be further conventionally processed to form individual reclosable plastic containers.

Figure 2:
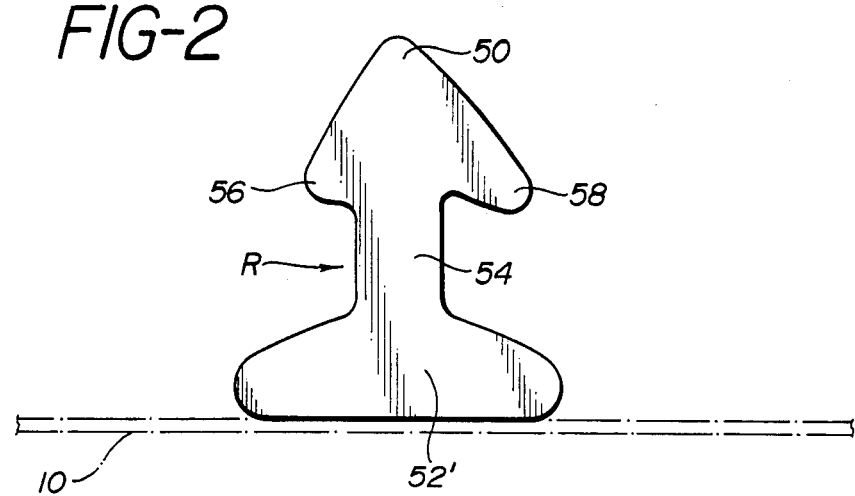
FIG. 2 is an enlarged side elevational view of a rib fastener element secured to a film web.
Figure 3:
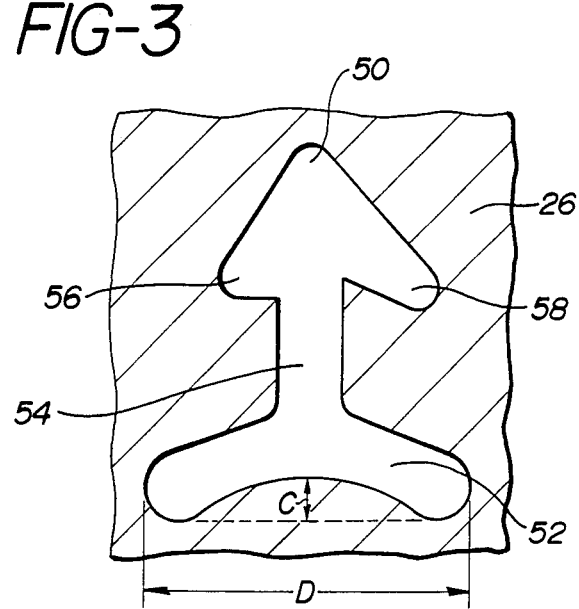
FIG. 3 is an enlarged cross-section of the die orifice through which the rib element of FIG. 2 was extruded.

As best illustrated in FIGS. 2 and 3, which are greatly enlarged for purposes of illustration, the rib element (R) is extruded from outlet 28 of die block 26 and has, upon exiting the die, a generally arrowhead-shaped tip 50 and a concave tail 52. The tip 50 and tail 52 are joined together by a generally upstanding stem 54. Tip 50 has asymmetrical sides 56, 58 which are designed to mate with corresponding asymmetrical hook elements on the groove fastener element as explained in further detail below.

FIG. 2 illustrates the shape of the rib element R after it has been secured to web 10. Post extrusion flow of the hot fastener element coupled with some shrinkage during cooling results in a rib element having a generally flat, rather than concave, base 52'. As shown, the thickness of upstanding stem 54 and tail 52 are approximately equal. Likewise, the ratio of the overall height of the fastener element to the overall length of the tail is also approximately 1:1. While the actual dimensions of the rib element will vary depending upon the desired end use and size of plastic container it is to be secured to, the proportions and ratios illustrated in the drawing figures and described above are maintained.

The tail 52 on the rib element of the present invention is quite short in relation to the extended bases utilized for prior art rib elements. It was found that such extended bases resulted in entrapment of air beneath the fastener element during joinder with the film web. Such air entrapment weakened the strength of the bond between fastener element and film web. Such an extended base was also believed to be necessary by the prior art to maintain the rib element upright during joinder to the film web. Surprisingly, it was found that by use of the rib design of the present invention such an extended base could be eliminated with concomitant elimination of the air entrapment problem and with no problem in maintaining the element upright during joinder.

As also shown in FIG. 2, the tail 52 of the rib element is designed to be somewhat concave as the rib element leaves the die. preferably, the lower surface of the tail is defined by the arc of a circle having a radius of between 0.15 to 0.20 inches, and most preferably of approximately 0.175 inches. In other words, the degree of concavity of the tail, which for purposes of the present invention is defined as the ratio of the vertical distance from the highest point on the lower surface of the tail to the lowest point on the lower surface of the tail (shown as distance C in FIG. 3), to the length of the tail (shown as distance D in FIG. 3), should be approximately 0.1.

This degree of concavity has been found, as a result of post extrusion flow of the hot fastener element, to result in a rib element having a generally flat base 52', as shown in FIG. 2. Rib elements extruded with lesser degress of concavity result in elements having rounded (convex) bases which cause problems in maintaining the element upright during joinder. On the other hand, extruding a rib element with greater concavity results in an element which is still somewhat concave and which may entrap air beneath the element during joinder with a film web.

Referring now to FIGS. 4 and 5, which again are greatly enlarged for purposes of illustration, the groove element (G) of the present invention is extruded from the outlet of die block 26' and has, upon exiting the die, the configuration shown in FIG. 5. Groove element G comprises a generally flat base portion 60 having a pair of generally upstanding neck elements 62, 64 disposed on opposite ends of base 60. Base 60 does not extend beyond neck elements 62, 64 as in the case of some prior art designs which utilized extended bases. Each of the neck elements 62, 64 have respective inwardly facing hook portions 66, 68 which are adapted to mate with the corresponding arrowhead-shaped tip portion of rib element R to effect a seal.

Figure 4:
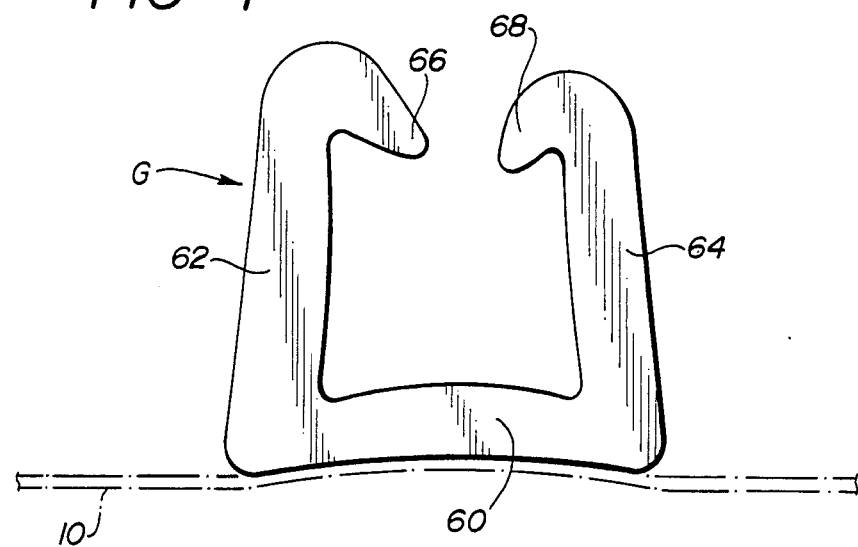
FIG. 4 is an enlarged side elevational view of a groove fastener element secured to a film web.
Figure 5:
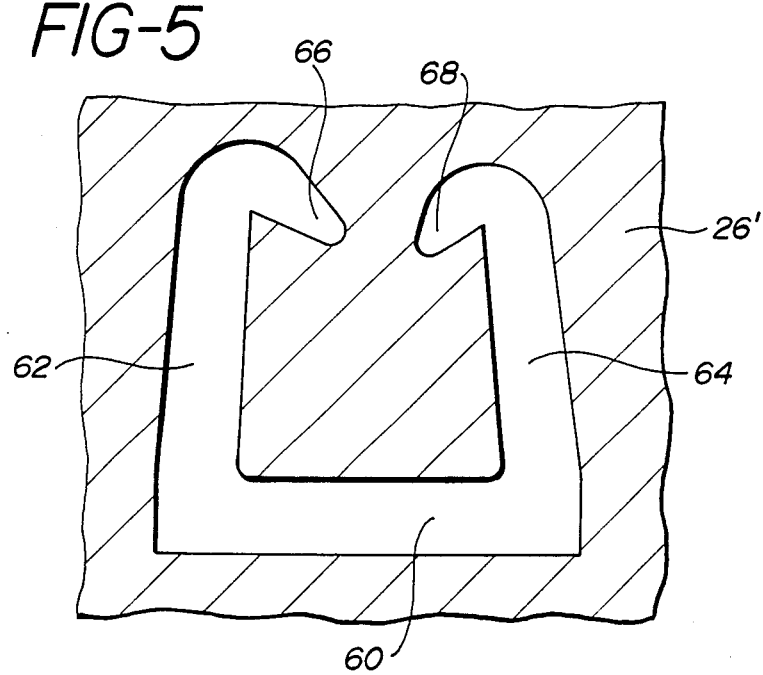
FIG. 5 is an enlarged cross-section of the die orifice through which the groove element of FIG. 4 was extruded.

FIG. 4 illustrates the shape of the groove element G after it has been secured to web 10. Post extrusion flow of the hot fastener element coupled with some shrinkage of the element during cooling results in the formation of a slight concavity in base 60 as shown. As this concavity develops after joinder of the element to the film web, no air entrapment is caused. As shown, the thicknesses of the base 60 and neck elements 62, 64 are substantially equal. Typically, the extruded thicknesses of the base and neck elements as they leave the die are approximately 0.06 inches. However, because of shrinkage of the element during cooling and post extrusion flow, final thicknesses for the base and neck elements are typically about 0.015 to 0.020 inches. Of course, the actual dimensions of groove element G will vary depending upon the desired end use and size of plastic container it is to be secured to. However, the proportions illustrated in the drawing figures and described above are maintained.

Surprisingly, the absence of an extended base on groove element G does not adversely affect either its adherence to the film web or its stability during joinder. Rather, air entrapment problems which occurred with prior art elements having extended bases have been substantially eliminated.

Preferably, the rib and groove elements of the present invention are made of a melt processable thermoplastic resin such as polyethylene. Additionally, it may be desirable to utilize the same thermoplastic resin for both the fastener elements and the film web. Once the respective rib and groove elements have been secured to the film web the web assembly may be further processed as is conventional in the art to form individual reclosable, flexible plastic containers. Such containers typically comprise a bag body having flexible walls of a plastic film and an opening therein. The releasably interlocking rib and groove fastener elements are secured to respective opposing facing inner surfaces of the bag walls. The container is sealed by applying pressure to the opposing rib and groove elements causing them to interlock. The container maybe opened by applying pressure to pull the releasably interlocked element apart.

While certain representative embodiments and details have been shown for purposes of illustrating the invention, it will be apparent to those skilled in the art that various changes in the methods disclosed herein may be made without departing from the scope of the invention, which is defined in the appended claims. For example, while tip 50 is preferably generally arrowhead-shaped, it can take on other shapes such as the split male arrangement of web 22 in U.S. Pat. No. 4,212,337.

What is claimed is:

1. A method of forming a ribbed plastic fastener element for use on a reclosable plastic container comprising the steps of melt processing a thermoplastic resin to form a flowable molten plastic resin and extruding said molten plastic resin from a die to form a rib element, said rib element upon exiting from said die having a tip and a concave tail, said tip and tail being connected together by an upstanding stem, the ratio of the overall height of said fastener element to the length of said tail being approximately 1:1.

2. The method of claim 1 in which the ratio of the thickness of said stem to the thickness of said tail is approximately 1:1.

3. The method of claim 1 in which the degree of concavity of said tail is approximately 0.1.

4. The method of claim 1 in which post extrusion flow of the extruded rib element results in a tail which is substantially flat.

5. The method of claim 1 in which the lower surface of said tail is defined by the arc of a circle having a radius of between 0.15 and 0.20 inches.

6. The method of claim 5 in which said circle has a radius of 0.175 inches.

7. A method for securing a ribbed plastic fastener element on a traveling plastic film web comprising the steps of extruding a rib plastic fastener element from an extrusion die, said rib element upon exiting from said die having a tip and a concave tail, said tip and tail being connected together by an upstanding stem, guiding said rib element into convergence with a traveling film web, and joining said rib element and film web together to secure said rib element to said film web, whereby post-extrusion flow of said rib element results in a relatively flat tail on said rib element which is secured to said film web.

8. The method of claim 7 in which said film web and said rib element are both polyethylene.

9. The method of claim 7 in which the heat from the freshly extruded rib element is used to fuse the tail of said rib element to said film web.

10. The method of claim 7 in which the ratio of the thickness of said stem to said tail is approximately 1:1.

11. The method of claim 7 in which the ratio of the length of said stem to said tail is approximately 1:1.

* * * * *